W. H. HENDERSON.
Churn.
No. 80,174.
Patented July 21, 1868.
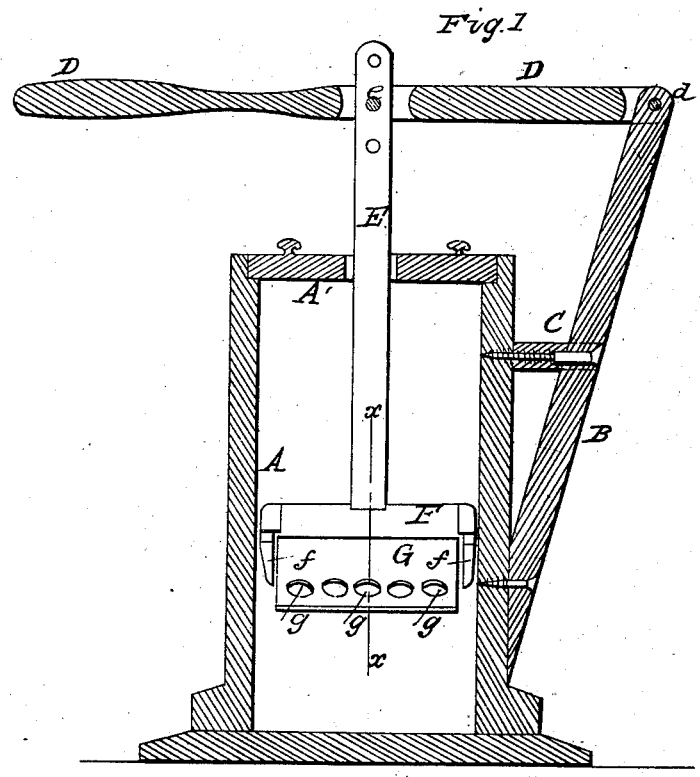
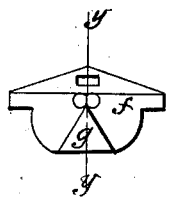
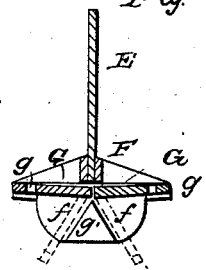
Witnesses
Jos'd Peyton
Baltis Di Long
Inventor
W. H. Henderson
by his Atty.
Wm. D. Baldwin

United States Patent Office.

WILLIAM H. HENDERSON, OF WEST POINT, ASSIGNOR TO WILLIAM H. SNIDER, OF LENA, ILLINOIS.

Letters Patent No. 80,174, dated July 21, 1868.

IMPROVEMENT IN CHURNS.

The Schedule referred to in these Letters Patent and making part of the same.

TO WHOM IT MAY CONCERN:

Be it known that I, WILLIAM H. HENDERSON, of West Point, in the county of Stephenson, and State of Illinois, have invented a new and useful Improvement in Churns, of which the following is a full, clear, and exact description, reference being had to the accompanying drawings, which make part of this specification, and in which—

Figure 1 represents a vertical central section through a churn to which my improvement is applied, showing a side elevation of the dasher.

Figure 2 represents a vertical transverse section through the dasher at the line $x\ x$ of fig. 1.

Figure 3 represents a view in elevation of the inner side of one of the dasher-heads or end-boards, and Figure 4 a vertical section through the same at the line $y\ y$ of fig. 3.

My invention relates to that class of churns having hinged vertically reciprocating dashers, and its object is to promote the rapid formation of butter by forcing air into the cream, as well as by agitating it by the dasher; and to this end the improvement herein claimed consists—

First, in a novel method of combining, with a vertically-reciprocating churn-dasher, hinged leaves oscillating on a horizontal axis, and having perforations on their outer edges for the escape of the air, whereby air enters below the leaves on the upward stroke of the dasher, and is forced through the cream on the downward stroke, thus thoroughly agitating it.

Second, in a novel method of combining in a churn a vertically-reciprocating dasher, oscillating perforated leaves, and stops on the dasher-heads to prevent the leaves from coming so closely together as to prevent their being opened by the downward pressure of the dasher.

In the accompanying drawings, A represents a box, to which an inclined standard, B, is secured by proper fastenings and a brace, C. A lever-handle, D, is pin-jointed to this standard at $d$, so as to play freely vertically. The box has a removable lid, A', of suitable construction, perforated for the passage of the dasher-staff.

A dasher-staff, E, is in like manner pin-jointed at $e$ to the lever-handle, and carries on its lower end a cross-head, F, provided with vertical heads or end-boards $f$. Dasher-leaves, G, are pivoted at their upper edges in these end-boards, so as to oscillate freely in a vertical plane. The pivot-holes are shown in figs. 3 and 4. Holes, $g$, near the lower edges of the leaves, permit air to pass as well as the cream, as hereinafter explained. Triangular stops, $g'$, on the end-boards, prevent the leaves from passing downwards beyond the angle of the red lines in fig. 2, and thus keep them in proper position to be pressed upward by the descent of the dasher. They are in like manner prevented from rising above a horizontal position by the cross-head F, which overlaps their pivots, as shown in fig. 2.

In operation, as the dasher rises, the leaves G fall into the position shown in red lines in fig. 2. Air enters through the openings into the space between the leaves. As the dasher descends, this air is forced through the cream, escaping with it through the holes $g$, the leaves at the same time swinging out into the position shown by the full lines in fig. 2, in which position they extend almost entirely across the churn. This compound rising and falling and oscillating movement, together with the action of the air at each stroke of the dasher, produces a thorough agitation of the cream, and makes butter rapidly.

What I claim as my invention, and desire to secure by Letters Patent, is—

The combination of the vertically-reciprocating cross-head F and end-boards $f$, with the oscillating perforated dasher-leaves and stops, $g'$, all these parts being constructed, arranged, and operating as described.

In testimony whereof, I have hereunto subscribed my name.

W. H. HENDERSON.

Witnesses:
   AARON W. HALL,
   W. SNIDER.